United States Patent
Tsudaka et al.

(10) Patent No.: US 7,362,085 B2
(45) Date of Patent: Apr. 22, 2008

(54) POWER LINE CARRIER COMMUNICATION SYSTEM AND ITS COMMUNICATION DEVICE, AND METHOD FOR CONSTRUCTING POWER LINE CARRIER COMMUNICATION SYSTEM

(75) Inventors: Shinichiro Tsudaka, Tokyo (JP); Hideo Nakata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 184 days.

(21) Appl. No.: 11/316,747

(22) Filed: Dec. 27, 2005

(65) Prior Publication Data

US 2006/0208742 A1    Sep. 21, 2006

(30) Foreign Application Priority Data

Mar. 1, 2005   (JP)   ............................. 2005-056239

(51) Int. Cl.
*G01R 19/00*   (2006.01)
*G06F 15/16*   (2006.01)

(52) U.S. Cl. ........................................ 324/66; 709/227

(58) Field of Classification Search .................. 324/66, 324/532, 535, 126; 340/310.11, 310.01, 340/310.06, 310.08; 700/286; 702/62; 370/397; 709/225, 226, 227
See application file for complete search history.

(56) References Cited

U.S. PATENT DOCUMENTS 6,097,298 A * 8/2000 Brown ........................ 340/657

| | | | |
|---|---|---|---|
| 2003/0225893 A1* | 12/2003 | Roese et al. | 709/227 |
| 2003/0227373 A1* | 12/2003 | Lou et al. | 340/310.01 |
| 2004/0113757 A1 | 6/2004 | White, II et al. | |
| 2005/0226201 A1* | 10/2005 | McMillin | 370/348 |
| 2007/0093995 A1* | 4/2007 | Mollenkopf et al. | 703/4 |
| 2007/0160373 A1* | 7/2007 | Biegelsen et al. | 398/118 |

FOREIGN PATENT DOCUMENTS

JP    2004-64355    2/2004

* cited by examiner

*Primary Examiner*—Andrew H. Hirshfeld
*Assistant Examiner*—Hoai-An D. Nguyen
(74) *Attorney, Agent, or Firm*—Oblon, Spivak, McClelland, Maier & Neustadt, P.C.

(57) ABSTRACT

A power line carrier communication system includes a power line, a first communication device, a second communication device, the first and second communication devices being arranged on the power line and performing a communication via the power line, a storage section that stores information on a physical position of a first communication device, a detecting section that detects a communication state between the first and second communication devices, a relative position calculating section that calculates a relative position between the first and second communication devices based on the communication state, and an arithmetic operation section that calculates a physical position of the second communication device from the relative position and the information on the physical position of the first communication device stored in the storage section, and stores information on the calculated physical position of the second communication device into the storage section.

6 Claims, 7 Drawing Sheets

POWER LINE CARRIER COMMUNICATION SYSTEM AND ITS COMMUNICATION DEVICE, AND METHOD FOR CONSTRUCTING POWER LINE CARRIER COMMUNICATION SYSTEM

BACKGROUND OF THE INVENTION

1. Field of the Invention

The present invention relates to a power line carrier communication system in which a plurality of communication devices are arranged on a power line via which communications are performed and its communication devices, and a method for constructing a power line carrier communication system by arranging a new communication device on a power line.

2. Description of the Related Art

A power line carrier communication system is a system in which a plurality of communication devices are arranged on a power line for the communication devices to perform communications via the power line. When the system is constructed, the attaching positions of the communication devices arranged in the system are identified and managed.

In the power line carrier communication system, communications are made using a power line for feeding power rather than a communication line dedicated to communications such as normal communications via a signal line. Thus, a communication device of a communication system cannot always be arranged at a desired position. To identify its position, it is necessary to identify its position after it is arranged.

When the number of communication devices is small, an approach to manually identify the position of each communication device is effective, when the number of communication devices is large or communication devices are arranged in a wide area, the identifying task is a considerable load. In recent years, it is desired to identify the position of each communication device by using a position identification device.

As a related art position identification technique using the position identification device, there has been proposed a method for identifying the position of a communication device by using a position information detecting device separate from a communication device attached to a power line. In this method, a communication device attached to a power line has a radio communication feature previously added and a position information detecting device having a GPS (Global Positioning System) feature and a radio communication feature is brought near a communication device attached to a power line in order to identify its position. The position information detecting device uses the radio communication feature to transmit the position information identified by the GPS feature to the communication device, and the communication device transits the position information received via the radio communication feature to a management terminal via a power line (JP-A-2004-64355, FIG. 1, etc.).

In the method described in JP-A-2004-64355, it is necessary to add a radio communication feature to a communication device of a power line carrier communication system. Further, in this method, although a position identification device is used, an operator presses a button on the position information detecting device to acquire the position information at the position and the position information acquired is transmitted to the communication device, rather than automated identification of the communication device.

It is thus necessary to manually identify the position of each communication device by using the position information detecting device. In case more communication devices are used or the area of the power line carrier communication system is wide, such as in case the system is constructed outdoors, the above approach is impractical.

SUMMARY OF THE INVENTION

The invention provides a power line carrier communication system capable of automatically acquiring the information on the physical position of each communication device and its communication device, and a method for constructing the power line carrier communication system.

According to an aspect of the present invention, a power line carrier communication system includes a power line, a first communication device, a second communication device, the first and second communication devices being arranged on the power line and performing a communication via the power line, a storage section that stores information on a physical position of a first communication device, a detecting section that detects a communication state between the first and second communication devices, a relative position calculating section that calculates a relative position between the first and second communication devices based on the communication state detected by the detecting section, and an arithmetic operation section that calculates a physical position of the second communication device from the relative position calculated by the relative position calculating section and the information on the physical position of the first communication device stored in the storage section and stores information on the calculated physical position of the second communication device into the storage section.

A power line carrier communication system according to the invention includes a storage section that stores information on the physical position of a first communication device, a detecting section that detects the communication state between the first communication device and a second communication device, a relative position calculating section that calculates a relative position between the first communication device and the second communication device based on the communication state detected by the detecting section, and an arithmetic operation section that calculates the physical position of the second communication device from the relative position calculated by the relative position calculating section and information on the physical position of the first communication device stored in the storage section and stores into the storage section the information on the calculated physical position of the communication device. Thus, when a communication device is connected to a power line, the physical position of the communication device is automatically calculated thereby facilitating management of the communication device.

DETAILED DESCRIPTION OF THE INVENTION

An embodiment of the invention will be described referring to drawings.

Embodiment 1

Figure 1:
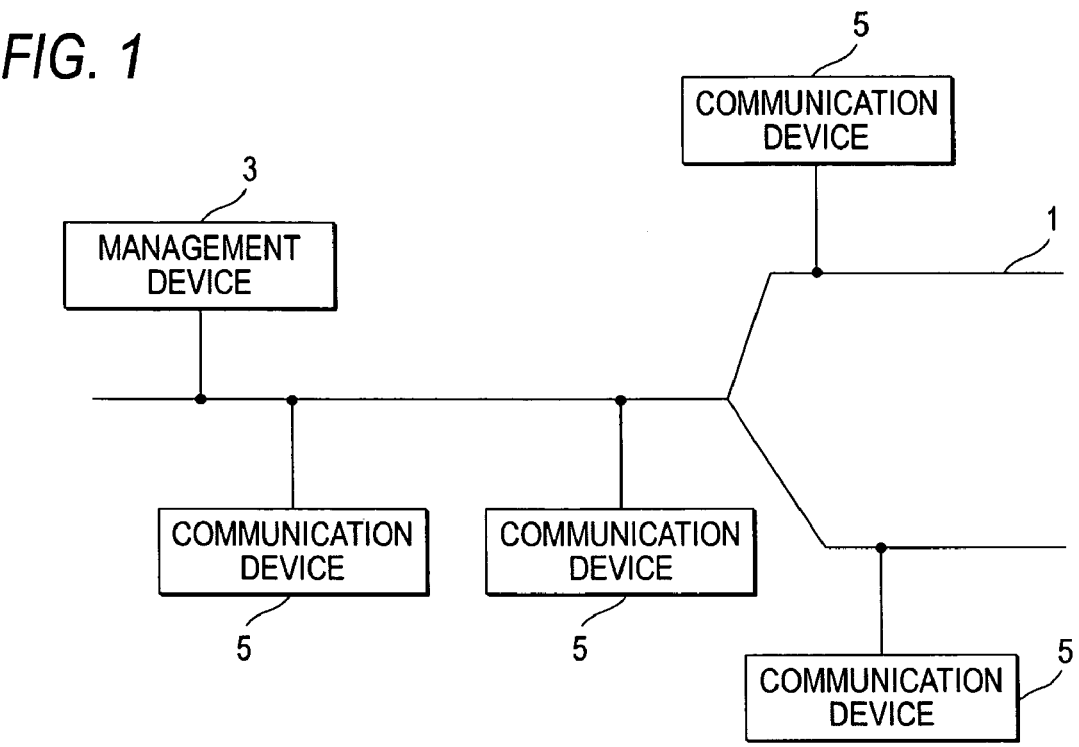
FIG. 1 shows the configuration of a power line carrier communication system according to Embodiment 1 of the invention.

FIG. 1 shows the configuration of a power line carrier communication system according to Embodiment 1. As shown in FIG. 1, a management device 1 and a plurality of communication devices 5 are arranged on a power line 1 for feeding power. Communications are made between the plurality of communication devices via the power line 1.

In this example, the management device 3 for management is provided although a management feature may be added to a predetermined communication device without using a dedicated management device.

Figure 2:
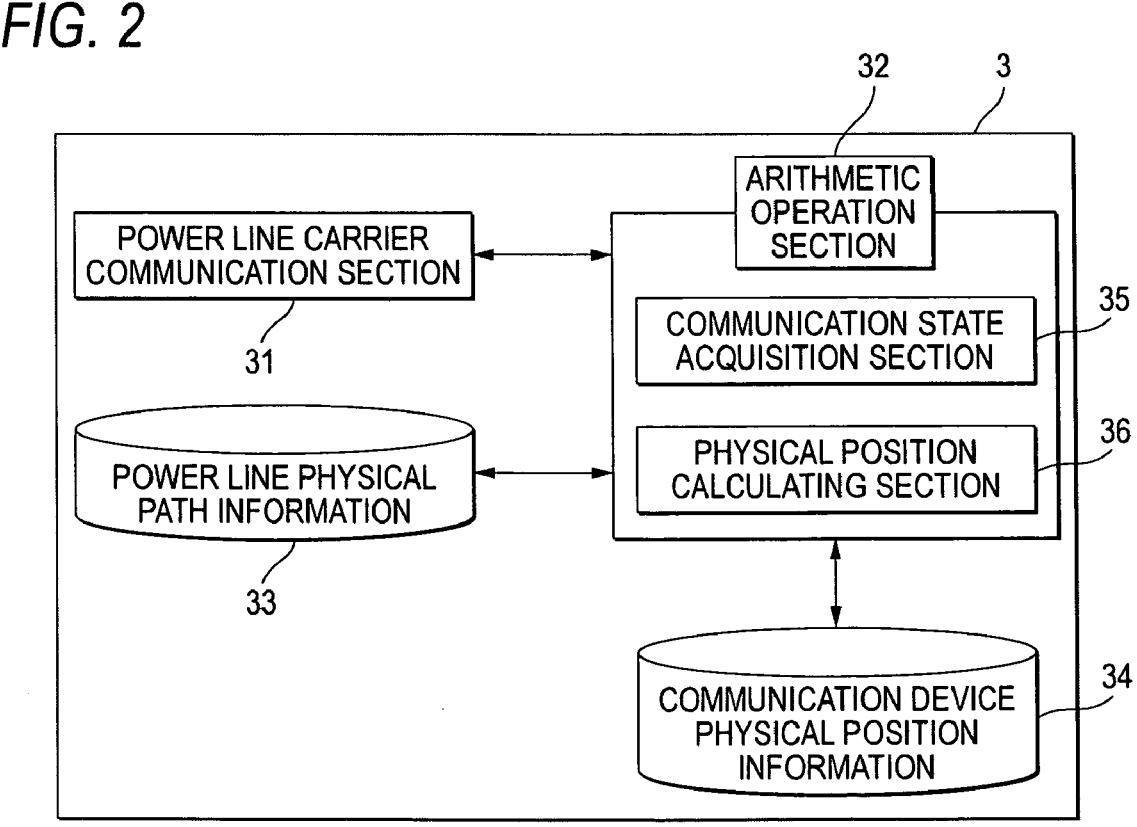
FIG. 2 is a block diagram showing the structure of the management device shown in FIG. 1.

FIG. 2 is a block diagram showing the structure of the management device 3. As shown in FIG. 2, the management device 3 includes a power line carrier communication section 31 for performing communications via a power line 1, an arithmetic operation section 32, a database 33 for retaining power line physical path information on the physical path of the power line 1, and a database 34 for retaining communication device physical position information on the physical position of a communication device 5 (including a management device 3). The physical position refers to an absolute position rather than a relative position.

The arithmetic operation section 32 includes a communication device communication state acquisition section 35 that acquires a communication state by communicating with the communication device 5, a communication state acquisition section 35, and a communication device physical position calculating section 36 that calculates the physical position of the communication device 5 by using power line physical path information and communication device physical position information respectively stored in the storage sections (databases 33, 34).

The management device 3 as a first communication device detects a communication state from the second communication device 5 on the communication device communication state acquisition section 35. The management section 3 acquires a relative position between the second communication device 5 and the management device 3 based on the communication state on the relative position calculating section in the position calculating section 36, and identifies the position of the second communication device 5 from the result of calculation in the relative position calculating section and the information on the position of the management device 3 stored in the database 34.

Figure 3:
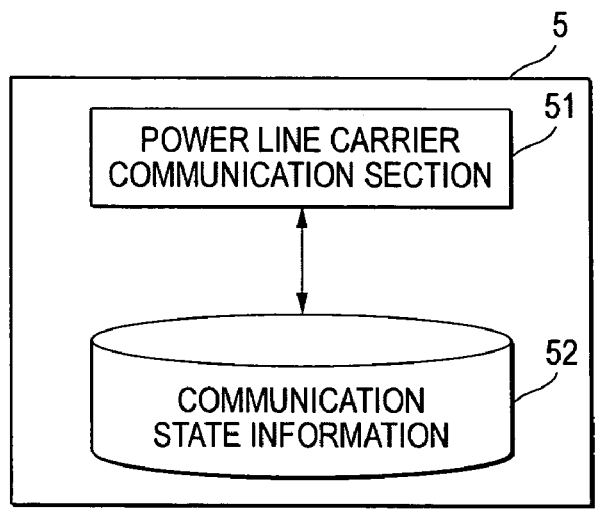
FIG. 3 is a block diagram showing the structure of the communication device shown in FIG. 1.

FIG. 3 is a block diagram showing the structure of the communication device 5 shown in FIG. 1. As shown in FIG. 3, the communication device 5 includes a power line carrier communication section 51 for performing communications via the power line 1 and a communication state information retaining section 52 for retaining the communication state.

In Embodiment 1, it is assumed that a new communication device added to the communication system transmits a signal having the strength $A_0$.

Figure 4:
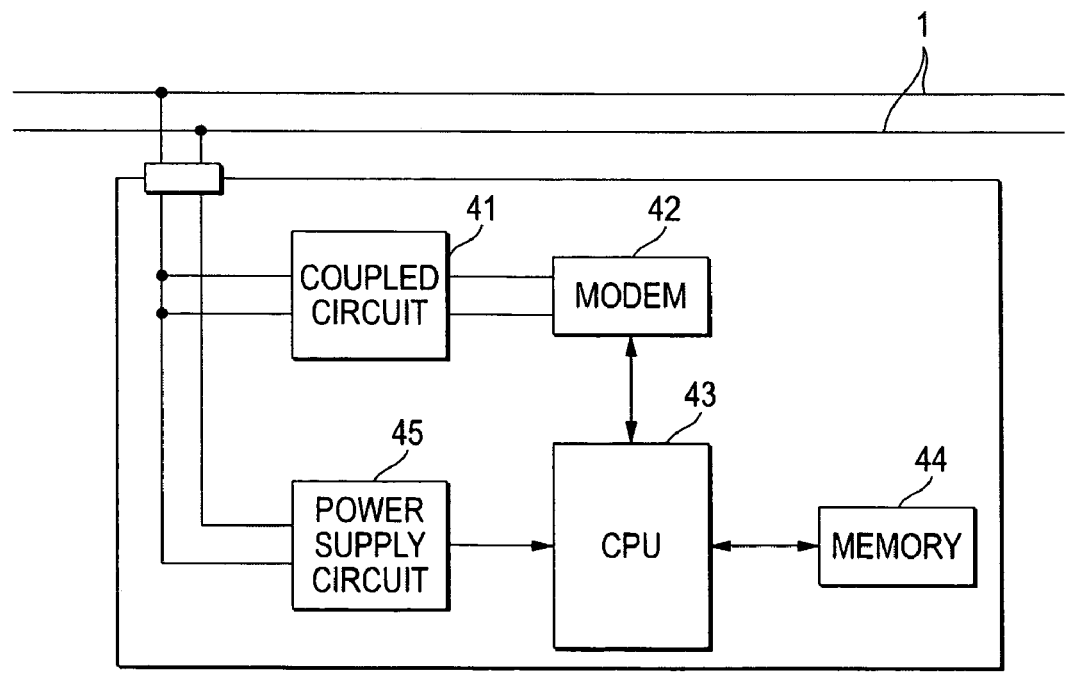
FIG. 4 shows the circuit configuration of the management device shown in FIG. 1.

FIG. 4 shows the circuit configuration of the management device 3 shown in FIG. 1, including the power line 1. As shown in FIG. 4, the management device 3 includes a coupled circuit 41 for connecting to the power line 1, a modem 42 connected to the coupled circuit 41 for outputting a signal to the power line 1 via the coupled circuit 41 and inputting a signal from the power line 1, a CPU 43 for controlling the information acquired from the modem 42 and performing arithmetic operation, a memory 44 that stores various types of information, and a power supply circuit 45 connected to the power line 1.

The communication device 5 is the same as the management device 3 shown in FIG. 4 except that the information stored in the memory and the content of arithmetic operation in the CPU are different. Thus, the communication device 5 may use the management device 3 shown in FIG. 4. While a general configuration of the management device 3 or communication device 5 is shown, the management device 3 or communication device 5 may be otherwise configured.

Operation of the communication system according to Embodiment 1 will be described.

Figure 5:
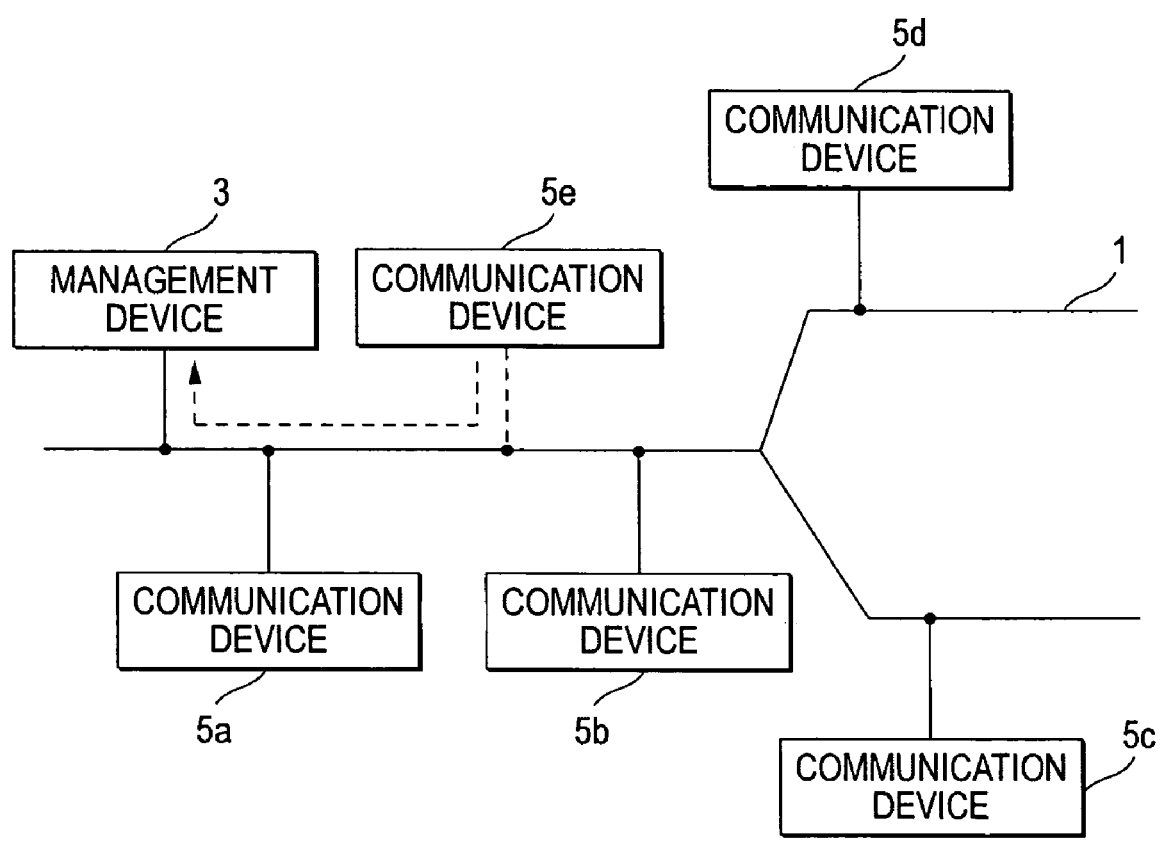
FIG. 5 illustrates the operation of the communication system shown in FIG. 1.
Figure 6:
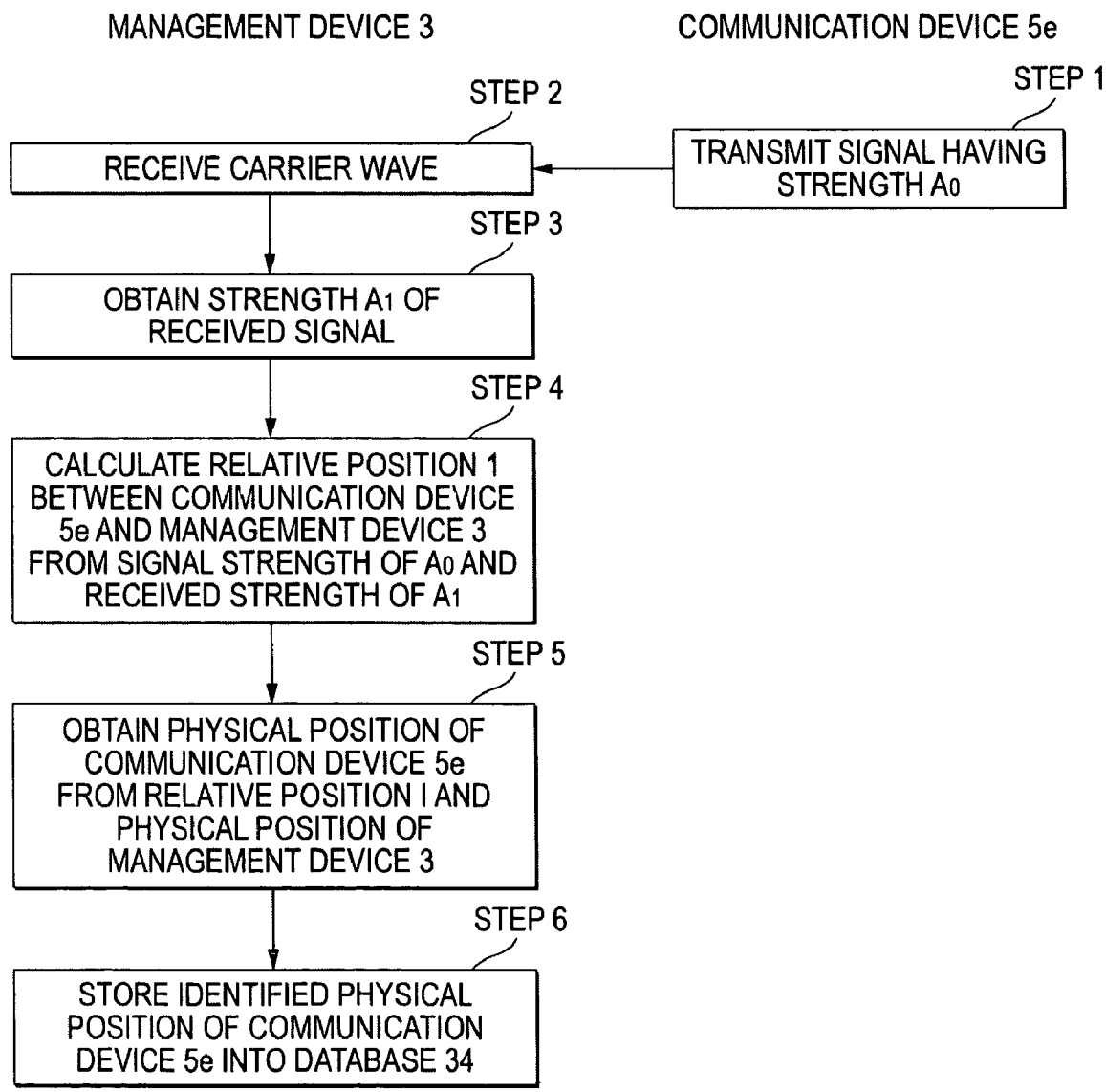
FIG. 6 is a flowchart explaining the operation of the communication system according to Embodiment 1 of the invention.

FIG. 5 illustrates the operation of the communication system shown in FIG. 1. FIG. 6 is a flowchart explaining the operation of the communication system.

As shown in FIG. 5, communication devices 5a, 5b, 5c, 5d are arranged as existing communication devices 5 and a new communication device 5e is attached between the communication device 5a and the communication device 5b in this example.

As shown in FIGS. 5 and 6, the communication device 5e, once connected to the power line 1, outputs a signal (carrier wave) of the strength $A_0$ to the power line 1 (Step 1). The output carrier wave is transmitted via the power line 1. The carrier wave is observed by the management device 3 (Step 2). The strength $A_1$ of the observed carrier wave is acquired by the communication state acquisition section 35 (Step 3).

In general, the strength of a signal attenuates with the transmission path length. Thus, in case an attenuation characteristic is known with respect to a path length, observation at two points can identify the location of the signal source.

Assume that the signal strength becomes one A-th (A typically being greater than 1) as the signal travels on the path every unit distance. Given the magnitude of the signal at the signal source as a and the magnitude of the signal at a point away from the signal source by a path length of l as f(l,a), the expression $$f(l,a) = a \cdot A^{-l} \tag{1}$$

is obtained. Assuming that the new communication device 5e transmits a signal having the strength $A_0$ and the signal having the strength $A_1$ is received by the management device 3, the expression $$A_1 = A_0 \cdot A^{-l} \quad (2)$$

is obtained.

Transforming the expression (2) obtains $$l = -\log_A(A_1/A_0) \quad (3)$$

The relative position l between the new communication device 5e and the management device 3 may be obtained from the expression (3). In case the physical position of the management device 3 is known, the physical position of the management device 3 and the relative position l obtained from the expression (3) may be used to obtain the physical position of the newly connected communication device 5e.

In the relative position calculating section of the communication device physical position calculating section 36, the relative position l between the communication device 5e and the management device 3 is obtained from the strength $A_0$ and the strength $A_1$, (Step 4). In the communication device physical position calculating section 36, the physical position of the management device 3 stored in the database 34 and the relative position l are used to obtain the physical position of the newly connected communication device 5e (Step 5).

In fact, the physical position of the communication device 5e may be more accurately determined by referencing the information on the physical path of the power line 1 stored in the database 33, as well as by using the physical position of the management device 3 and the relative position l.

The physical position of the communication device 5e thus obtained is stored in the database 34 (Step 6) and is later used to identify the physical position of a new communication device or manage/control the communication device 5e.

The power line carrier communication system according to Embodiment 1 automatically acquires the physical position of a communication device thus facilitating management of the communication device.

While Embodiment 1 detects on the first communication device the signaling state between the first communication device as a management device and the second communication device, an arrangement is possible where a signal from the first communication device is detected by the second communication device and retained in the communication state information retaining section 52, then the information is transmitted to the second communication device in order for the management device to acquire the signaling state between the first communication device and the second communication device.

While management device receives an output signal from the second communication device in Embodiment 1, an arrangement is possible where an adjacent communication device (or any communication device capable of receiving a signal) receives an output signal from the second communication device and transmits the signal to the management device in order to obtain a relative position between the second communication device and the adjacent communication device and further obtain the absolute position of the second communication device from the absolute position of the adjacent communication device and the relative position obtained.

Another arrangement is possible where each communication device includes the position identification feature of a management device and a communication device other than a management device identifies the position of a new communication device and transmits information on the identified position to the management device, thus allowing the management device to recognize the physical position of the new communication device.

Embodiment 2

While only the first communication device is used to identify the position of the second communication device to be located in Embodiment 1, a power line carrier communication system according to Embodiment 2 uses two communication devices, that is, the first communication device and a third communication device, to identify the physical position of the second communication device to be located.

The management device 3 according to Embodiment 2 is the same as that shown in FIG. 2 except that the communication state acquisition section 35 shown in FIG. 2 detects a first communication state between the adjacent first communication device and the second communication device to be located and a second communication state between the adjacent third communication device and the second communication device in Embodiment 2. The position calculating section 36 calculates the physical position of the second communication device based on the information from the relative position detecting section that calculates a relative position between the second communication device and the first/third communication device based on the first and second communication state and the information on the calculated relative position and the physical position of each of the first and third communication devices.

The physical position of each communication device and the physical path of a power line across communication devices are known and stored in the databases 33, 34. The remaining system configuration and the configuration of communication devices are the same as those in Embodiment 1. Note that, the strength of a signal transmitted by a communication device may be unknown or may differ between communication devices.

While the first and third communication devices are communication devices adjacent to the second communication device, other communication devices may be used as long as they are capable of receiving a signal from the second communication device.

Operation of the communication system according to Embodiment 2 will be described.

Figure 7:
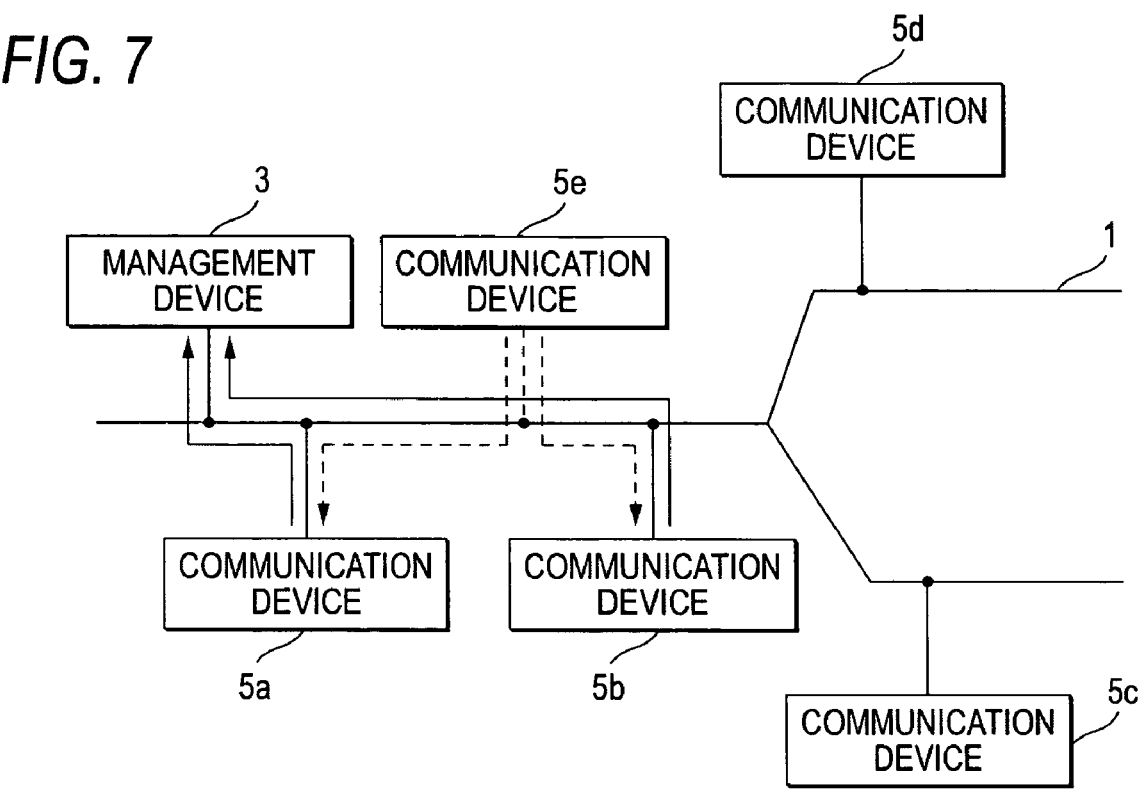
FIG. 7 illustrates the operation of the communication system according to Embodiment 2 of the invention.
Figure 8:
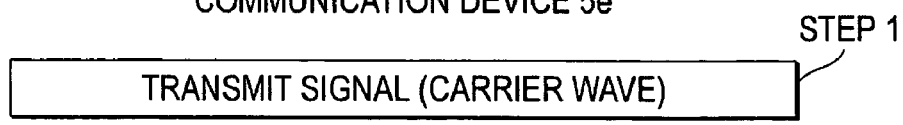
FIG. 8 is a flowchart explaining the operation of the communication system according to Embodiment 2 of the invention.
Figure 9:
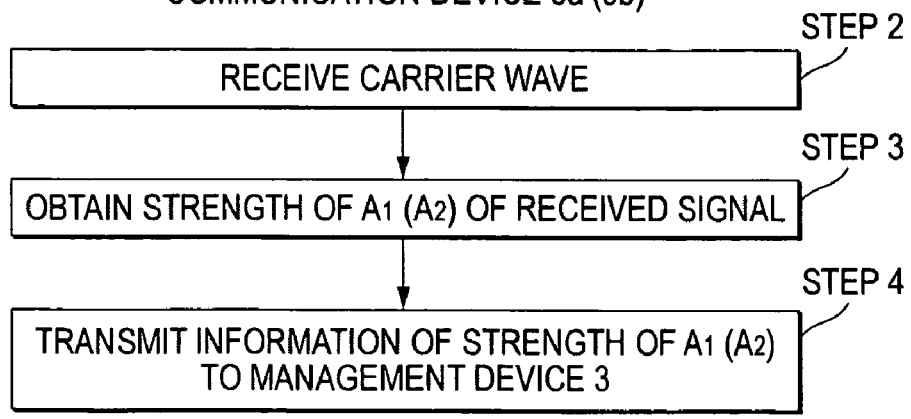
FIG. 9 is another flowchart explaining the operation of the communication system according to Embodiment 2 of the invention.
Figure 10:
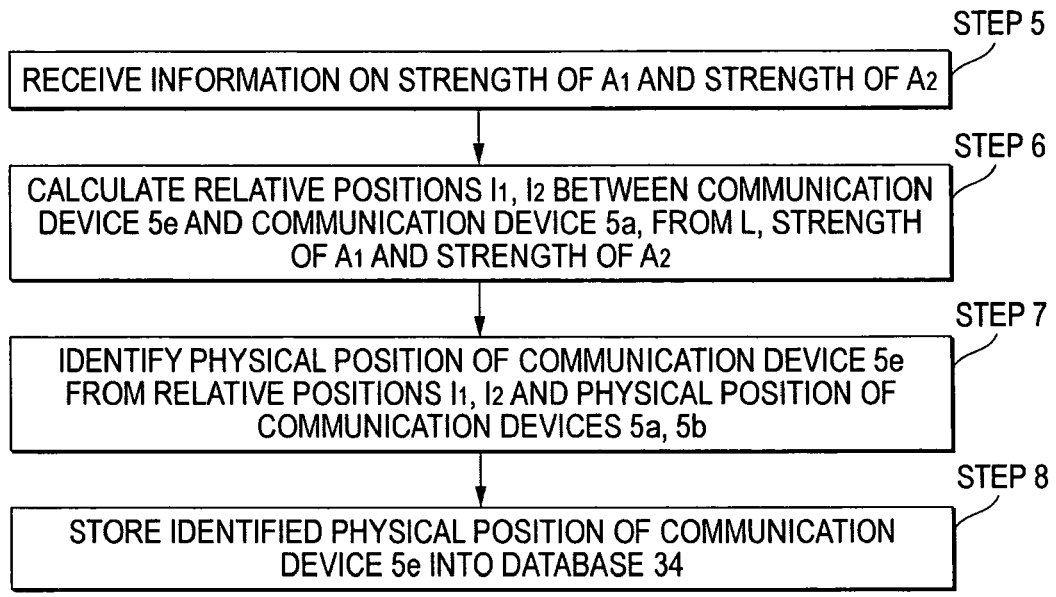
FIG. 10 is another flowchart explaining the operation of the communication system according to Embodiment 2 of the invention.

FIG. 7 illustrates the operation of the communication system according to Embodiment 2. FIGS. 8 to 10 are flowcharts explaining the operation of the communication system.

As shown in FIG. 7, communication devices 5a, 5b, 5c, 5d are arranged as existing communication devices 5 and a new communication device 5e is attached between the communication device 5a and the communication device 5b in this example.

As shown in FIGS. 7 though 10, the communication device 5e, once connected to the power line 1, outputs a signal (carrier wave) to the power line 1 (Step 1). The output carrier wave is transmitted via the power line 1. The carrier wave is observed for example by the adjacent first communication device 5a and the second communication device 5b, respectively (Step 2). The first (second) communication device 5a (5b) obtains the strength $A_1$ ($A_2$) of the observed carrier wave (Step 3) and retains the obtained strength $A_1$ ($A_2$) into the communication state information retaining section 52, and transmits the strength $A_1$ ($A_2$) to the management device 3 as information on the communication state (Step 4).

The management device 3 receives on the power line carrier communication section 31 the information transmitted from the first and third communication devices 5a, 5b and acquires the strength $A_1$, $A_2$ of each of the signals respectively received by the first and third communication devices 5a, 5b on the communication device communication state acquisition section 35 based on the information transmitted from the communication devices 5a, 5b (Step 5).

Assuming the path length from the first communication device 5a to the second communication device 5e as $l_1$, the path length from the third communication device 5b to the second communication device 5e as $l_2$, and the path length from the first communication device 5a to the third communication device 5b as L, the expression $$l_1 + l_2 = L \quad (4)$$

is obtained.

Here, the physical positions of the first communication device 5a and the second communication device 5b as well as the physical path to the power line 1 are known, so that L is known. From the expression (1), the following expressions are obtained:

$$A_1 = f(l_1, a) = a \cdot A^{-l_1} \quad (5)$$

$$A_2 = f(l_2, a) = a \cdot A^{-l_2} \quad (6)$$

From the expressions (4) to (6), the following expressions are obtained:

$$l_1 = (L - \log_A(A_1/A_2))/2 \quad (7)$$

$$l_2 = (L + \log_A(A_1/A_2))/2 \quad (8)$$

The relative position $l_1$, between the new communication device 5e and the first communication device 5a may be obtained from the expression (7). The relative position $l_2$ between the new communication device 5e and the third communication device 5b may be obtained from the expression (8).

In the relative position calculating section of the communication device physical position calculating section 36, the relative positions $l_1$, $l_2$ between the communication device 5e/communication device 5a and communication device 5b are obtained from the distance L, the strength $A_1$, and the strength $A_2$ by using the expressions (7) and (8) (Step 6). In the communication device physical position calculating section 36, the physical position of each of the first communication device 5a and the second communication device 5b stored in the database 34 and the relative positions $l_1$, $l_2$ are used to obtain the physical position of the newly connected communication device 5e (Step 7).

In fact, the physical position of the communication device 5e may be more accurately determined by referencing the information on the physical path of the power line 1 stored in the database 33, as well as by using the physical position of the management device 3 and the relative positions $l_1$, $l_2$.

The physical position of the communication device 5e thus obtained is stored in the database 34 (Step 8) and is later used to identify the physical position of a new communication device or manage/control the communication device 5e.

The position identification method in the power line carrier communication system according to Embodiment 2, physical positions of two communication devices and the relative position between the two communication devices are used to identify the position of a communication device to be located. This approach uniquely determines the position of a communication device thus allowing more precise position identification. The power line carrier communication system according to Embodiment 2 provides position identification of a communication device even in case the output signal from the communication device to be located is unknown.

While the signal strength is determined as a communication state and the signal strength obtained and the attenuation characteristic are used to calculate the path length in Embodiments 1 and 2, the invention is not limited thereto. For example, the difference between $l_1$ and $l_2$ may be calculated from the difference of time each of the first and the third communication devices has received a signal from the second communication device and the calculation result and the expression (4) may be used to obtain the relative positions $l_1$, $l_2$.

While the second communication device 5e is inserted between the first communication device 5a and the second cc 5b in Embodiment 2, other arrangement may be used to determine the path length. That is, in case the third communication device 5b is located between the first communication device 5a and the second communication device 5e, $l_2$ should be negative. In case the first communication device 5a is located between the second communication device 5e and the third communication device 5b, $l_1$ should be negative. As long as the physical path around the position where the second communication device 5e is attached is known, it is possible to obtain an accurate physical position from the calculated path length.

While an attenuation model is used where the signal strength becomes one Ath as the signal travels on the path every unit distance in Embodiment 2, another model of three simultaneous equations having three variables such as the expressions (4) to (6) may be solved to obtain the path length thus determining the physical position. Or, Embodiment 1 may use a model other than one where the signal strength becomes is one Ath as the signal travels on the path every unit distance.

Embodiment 3

Figure 11:
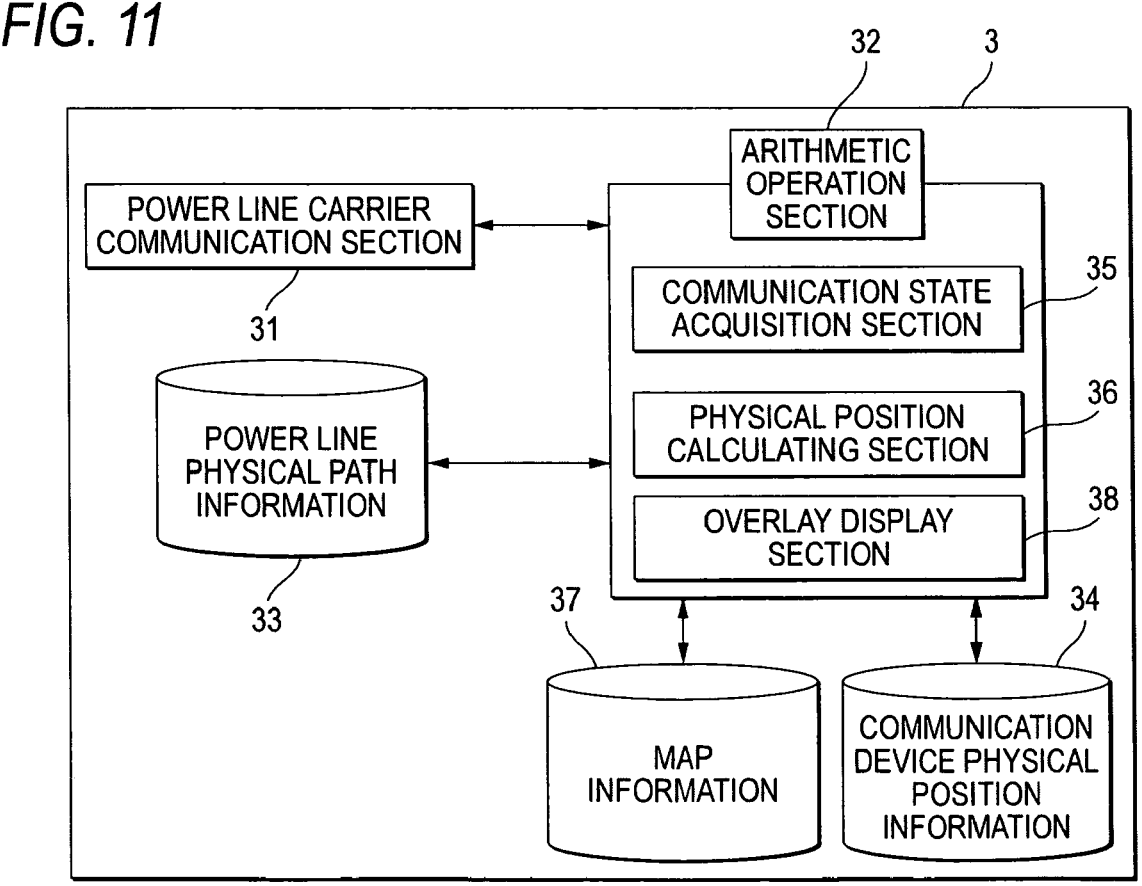
FIG. 11 shows a management device according to Embodiment 3 of the invention.

FIG. 11 shows a management device according to Embodiment 3. On top of the management device shown in FIG. 2, the management device according to Embodiment 3 includes a map information retaining section 37 for retaining map information, and an overlay display section 38 that displays, in an overlaid fashion, the power line physical path information stored in the database 33, the communication device physical position information stored in the database 34, and the map information stored in a map information retaining section 41. The management device is otherwise similar to that of Embodiments 1 and 2.

Figure 12:
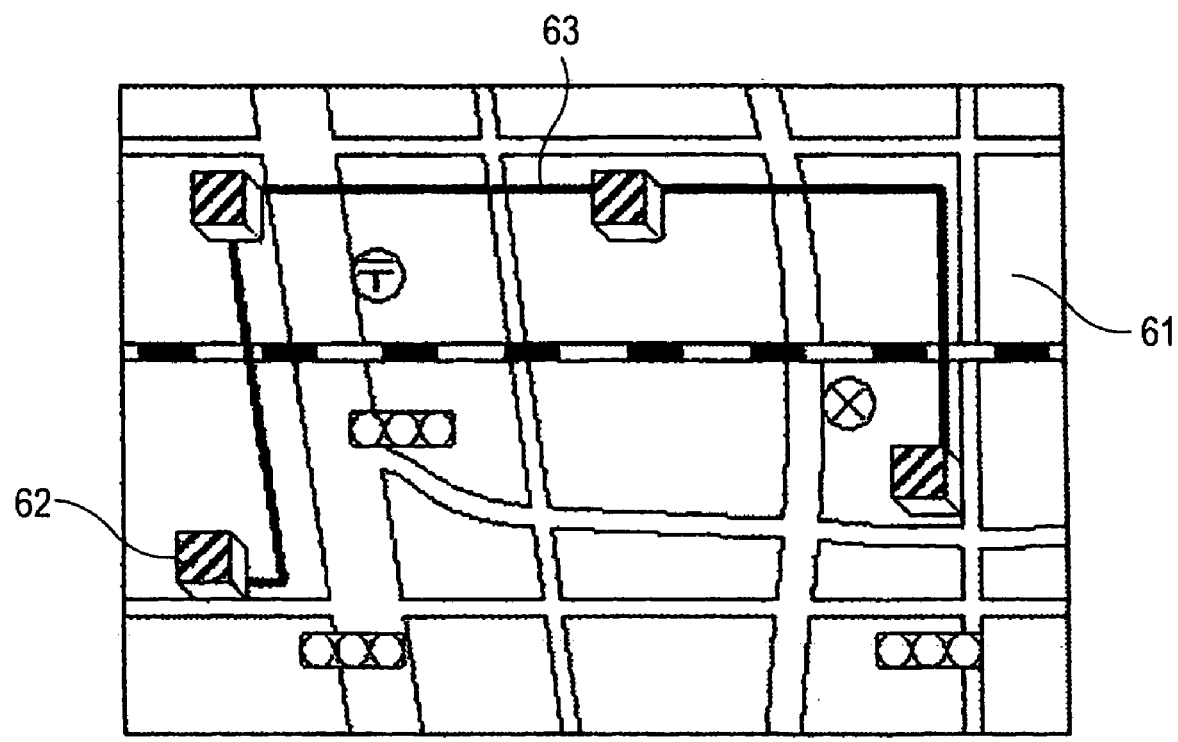
FIG. 12 shows an example of overlay display provided by the display section according to Embodiment 3 of the invention.

FIG. 12 shows an example of an overlay display provided by a display section according to Embodiment 3. As shown in FIG. 12, a map 61 extracted from the map information retaining section 37 is displayed in the background and on the map 61 is displayed an icon 62 showing a communication device in accordance with the position of the communication device extracted from the database 34. A power line path 63 extracted from the database 33 is also displayed.

By displaying such information in an overlaid fashion, the position of each communication device and connection of the power line are readily understood, thereby facilitating management of communication devices.

What is claimed is:

1. A power line carrier communication system comprising:
    a power line;
    a first communication device;
    a second communication device;

a third communication device, the first, second, and third communication devices being arranged on the power line and performing communications via the power line;

a storage section that stores information on a physical position of the first and third communication devices;

a detecting section that detects a first communication state between the first and second communication devices, and a second communication state between the second and third communication devices, wherein the first and second communication states are the signal strengths of received signals;

a relative position calculating section that calculates a first relative position between the first and second communication devices, and a second relative position between the second and third communication devices based on a ratio of (i) a signal strength received at the first communication device from the second communication device, and (ii) a signal strength received at the third communication device from the second communication device; and an arithmetic operation section that calculates a physical position of the second communication device from the first and second relative positions calculated by the relative position calculating section and the information on the physical position of the first and third communication devices stored in the storage section, and stores information on the calculated physical position of the second communication device into the storage section.

2. The power line carrier communication system according to claim 1, further comprising:

a display section that displays the position of the second communication device on a map in an overlaid fashion.

3. The power line carrier communication system according to claim 1, wherein the physical position of the second communication device is calculated based on a distance between the first and third communication systems.

4. The power line carrier communication system according to claim 1, wherein the relative position calculating section calculates the first and second relative positions in consideration of position information of the first and third communication devices on the power line.

5. A method for constructing a power line carrier communication system that arranges a new communication device onto the power line and identifies a position thereof to construct a network including a plurality of communication devices, the method comprising:

a step of arranging the new communication device onto the power line;

an acquisition step of performing a first communication between an existing first communication device, which is previously arranged on the power line and whose position is identified, and the new communication device to acquire a first communication state thereof, and a second communication between an existing second communication device, which is previously arranged on the power line and whose position is identified, and the new communication device to acquire a second communication state thereof, wherein the first and second communication states are the signal strengths of received signals;

a relative position calculating step of obtaining a first relative position between the new communication device and the first existing communication device and a second relative position between the new communication device and the second existing communication device based on a ratio of (i) a signal strength received at the existing first communication device from the new communication device, and (ii) a signal strength received at the existing second communication device from the new communication device; and a step of identifying a physical position of the new communication device from the first and second relative positions obtained in the relative position calculating step and the positions of the existing first and second communication devices.

6. A first communication device for communicating with a second communication device via a power line, comprising:

a storage section that stores information on a physical position of the first and third communication device;

an acquisition section that acquires a first communication state between the first communication device and the second communication device, and a second communication state between the second communication device and the third communication device connected to the power line, wherein the first and second communication states are the signal strengths of received signals;

a relative position calculating section that calculates a first relative position between the first communication device and the second communication device and a second relative position between the third communication device and the second communication device based on a ratio of (i) a signal strength received at the first communication device from the second communication device, and (ii) a signal strength received at the third communication device from the second communication device; and an arithmetic operation section that calculates a physical position of the second communication device from the first and second relative positions calculated by a relative position calculating section and the information on the physical positions of the first and third communication devices stored in the storage section, and stores information on the calculated physical position of the second communication device into the storage section.

* * * * *